(12) United States Patent
Nair

(10) Patent No.: US 11,899,718 B2
(45) Date of Patent: Feb. 13, 2024

(54) SYSTEMS AND METHODS FOR AUTOMATICALLY UPDATING GUARANTEED COMPUTING COUNTERS

(71) Applicant: Coupang Corp., Seoul (KR)

(72) Inventor: Vinaykumar Nair, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/376,433

(22) Filed: Jul. 15, 2021

(65) Prior Publication Data
US 2022/0197943 A1 Jun. 23, 2022

Related U.S. Application Data

(63) Continuation of application No. 17/128,828, filed on Dec. 21, 2020, now Pat. No. 11,100,166.

(51) Int. Cl.
*G06F 16/00* (2019.01)
*G06F 16/901* (2019.01)
*G06F 16/958* (2019.01)

(52) U.S. Cl.
CPC .......... *G06F 16/901* (2019.01); *G06F 16/958* (2019.01)

(58) Field of Classification Search
CPC .............................. G06F 16/901; G06F 16/958
USPC .................................................. 707/741, 746
See application file for complete search history.

(56) References Cited

U.S. PATENT DOCUMENTS

| 2006/0095559 | A1 | 5/2006 | Mangan et al. |
| 2013/0318097 | A1* | 11/2013 | Gambhir ................ G06Q 50/01 707/746 |
| 2014/0215562 | A1 | 7/2014 | Roberson et al. |
| 2016/0267512 | A1 | 9/2016 | Misra et al. |
| 2017/0270529 | A1 | 9/2017 | Ebel et al. |
| 2018/0308172 | A1* | 10/2018 | Daniels ................... G06Q 40/10 |

(Continued)

FOREIGN PATENT DOCUMENTS

| KR | 10-2018-0068686 A | 6/2018 |
| TW | I567673 | 1/2017 |
| TW | 201837699 A | 10/2018 |

OTHER PUBLICATIONS

Notice of Preliminary Rejection in counterpart Korean Patent Application No. 10-2021-7020448 dated Apr. 15, 2022 (6 pages).

(Continued)

*Primary Examiner* — Chelcie L Daye
(74) *Attorney, Agent, or Firm* — FINNEGAN, HENDERSON, FARABOW, GARRETT & DUNNER LLP

(57) ABSTRACT

A computer-implemented system for updating a counter value in a data structure. The system may include a memory storing instructions and at least one processor configured to execute the instructions to perform a process. The process may include receiving information relating to an event, and determining, for the event, a counter identifier value for the counter identifier field of the data structure. The data structure may include one or more entries. Each of the one or more entries may include the counter identifier field and a counter value field. The process may also include identifying, in the data structure, an entry that comprises a counter identifier value identical to the determined counter identifier value. The process may further include increasing a counter value in the counter value field of the identified entry.

18 Claims, 13 Drawing Sheets

(56) References Cited

U.S. PATENT DOCUMENTS

2021/0202003 A1* 7/2021 Varisco .................. G11C 16/20

OTHER PUBLICATIONS

Office Action in counterpart Taiwanese Patent Application No. 110116668 dated May 12, 2022 (19 pages).
International Search Report and Written Opinion of the International Searching Authority for International Application No. PCT/IB2021/050045, dated Sep. 15, 2021 (9 pages).
Rejection Decision in counterpart Taiwanese Application No. 110116668 dated Nov. 3, 2022 (8 pages).
Notice of Allowance and Search Report in Taiwanese Application No. 110116668 dated Dec. 8, 2023 (4 pages).

* cited by examiner

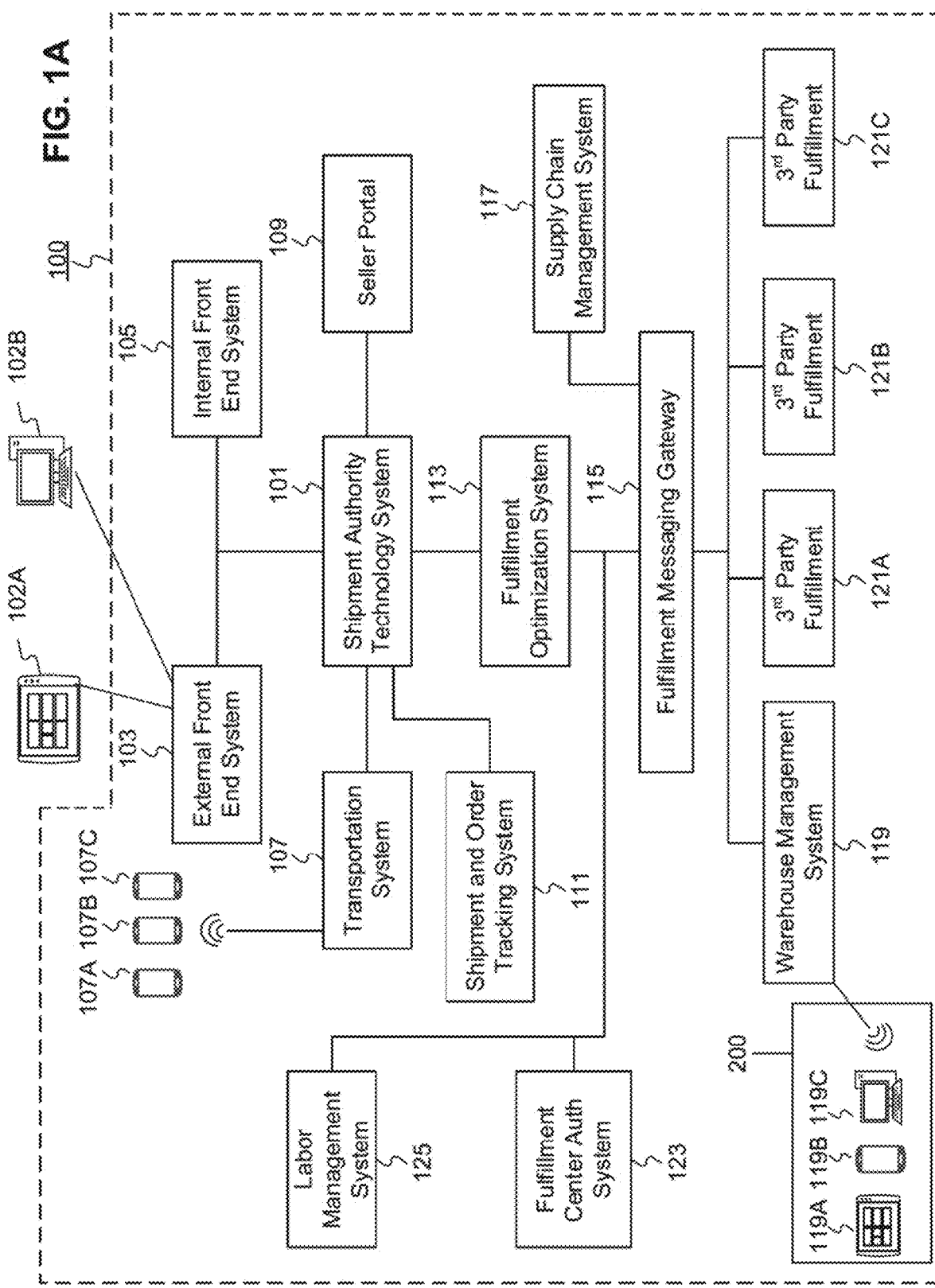

Initial Status: No downloads have occurred

500

| counter_id | user_id | reset_frequency | reset_at | value |
|---|---|---|---|---|
| M1 | ALL USERS | NONE | 9999-12-31 23:59:59.00Z | 0 |
| M1 | ALL USERS | DAILY | ** the time of the first download + 24 hours ** | 0 |

Event 1: User A downloaded M1 on June 26, 2020

500

| counter_id | user_id | reset_frequency | reset_at | value |
|---|---|---|---|---|
| M1 | ALL USERS | NONE | 9999-12-31 23:59:59.00Z | 1 |
| M1 | ALL USERS | DAILY | 2020-06-27T 00:00:00.00Z | 1 |
| M1 | A | NONE | 9999-12-31 23:59:59.00Z | 1 |
| M1 | A | DAILY | 2020-06-27T15:00:00.00Z | 1 |

Event 2: User A downloaded M1 again on the same day

| counter_id | user_id | reset_frequency | reset_at | value |
|---|---|---|---|---|
| M1 | ALL USERS | NONE | 9999-12-31 23:59:59.00Z | 2 |
| M1 | ALL USERS | DAILY | 2020-06-27T 00:00:00.00Z | 2 |
| M1 | A | NONE | 9999-12-31 23:59:59.00Z | 2 |
| M1 | A | DAILY | 2020-06-27T15:00:00.00Z | 2 |

FIG. 5C

Event 3: User B downloaded M1 on June 26, 2020

| counter_id | user_id | reset_frequency | reset_at | value |
|---|---|---|---|---|
| M1 | ALL USERS | NONE | 9999-12-31 23:59:59.00Z | 3 |
| M1 | ALL USERS | DAILY | 2020-06-27T 00:00:00.00Z | 3 |
| M1 | A | NONE | 9999-12-31 23:59:59.00Z | 2 |
| M1 | A | DAILY | 2020-06-27T 15:00:00.00Z | 2 |
| M1 | B | NONE | 9999-12-31 23:59:59.00Z | 1 |
| M1 | B | DAILY | 2020-06-27T 21:00:00.00Z | 1 |

FIG. 5D

SYSTEMS AND METHODS FOR AUTOMATICALLY UPDATING GUARANTEED COMPUTING COUNTERS

CROSS-REFERENCE TO RELATED APPLICATIONS

This application is a continuation of U.S. application Ser. No. 17/128,828, filed Dec. 21, 2020, now allowed, which is incorporated herein by reference in its entirety.

TECHNICAL FIELD

The present disclosure generally relates to computerized systems and methods for recording counter values relating to computing events. In particular, embodiments of the present disclosure relate to inventive and unconventional systems for updating counter values stored in a data structure associated with a series of computing events.

BACKGROUND

Online activities have become more and more popular in recent years. For example, customers can place orders for goods or services on numerous online platforms. To attract customers to shop at its website, an online platform sometimes provides a coupon (e.g., 30% off an item) to all customers that can be used a maximum number of times. Once the maximum number of uses of the coupon is reached, the online platform may prohibit any future use of the coupon. It may be vital to track the number of uses of the coupon accurately and efficiently. For instance, a large number of online orders placed by customers using the coupon may occur in a short period of time. If the online platform cannot count the times that the coupon has been used in real time accurately, the online platform may cut short the promotion unintentionally, defeating the purposes of the promotion. Alternatively, the online platform may allow the use of the coupon well beyond the maximum number it previously set, thereby incurring unnecessary loss.

Existing systems usually use counters (e.g., Cassandra counters) for counting occurrences of certain events such as using a coupon by customers. However, These counters may not be as efficient as other data types. For example, some applications using Cassandra counters may involve reading and writing data to multiple tables simultaneously or sequentially, which may impose potential risks of losing data or creating inconsistent data. Additionally, in some cases, data is written and then immediately read back, which may create random NullPointerExceptions (NPEs) and negatively affect the application performance. Besides, in existing counter applications, it may be inflexible to reset counters for different events (e.g., daily downloads and all-time downloads) having different reset frequencies and/or reset time periods.

Therefore, there is a need for improved methods and systems for updating counter values for computing events with more flexibility and higher efficiency.

SUMMARY

One aspect of the present disclosure is directed to a computer-implemented system for updating a counter value in a data structure. The system may include a memory storing instructions and at least one processor configured to execute the instructions to perform a process. The process may include receiving information relating to a first event, and determining, for the first event, a first counter identifier value for the counter identifier field of the data structure. The data structure may include one or more entries. Each of the one or more entries may include the counter identifier field and a counter value field. The process may also include identifying, in the data structure, a first entry that comprises a counter identifier value identical to the determined first counter identifier value. The process may further include increasing a counter value in the counter value field of the first entry.

Another aspect of the present disclosure is directed to a computer-implemented method for updating a counter value in a data structure. The method may include receiving information relating to a first event, and determining, for the first event, a first counter identifier value for the counter identifier field of the data structure. The data structure may include one or more entries. Each of the one or more entries may include the counter identifier field and a counter value field. The method may also include identifying, in the data structure, a first entry that comprises a counter identifier value identical to the determined first counter identifier value. The method may further include increasing a counter value in the counter value field of the first entry.

Yet another aspect of the present disclosure is directed to a computer-implemented system for updating a counter value in a data structure. The system may include a memory storing instructions and at least one processor configured to execute the instructions to perform a process. The process may include receiving information relating to an event, and determining, for the event, a plurality of counter identifier values for a counter identifier field of the data structure. The data structure may include one or more entries. Each of the one or more entries may include the counter identifier field and a counter value field. The process may also include identifying, in the data structure, an entry that comprises a counter identifier value identical to a first one of the determined counter identifier values. The process may further include increasing a counter value in the counter value field of the identified entry. The process may also include determining that the data structure does not comprise an entry that includes a counter identifier value identical to a second one of the determined counter identifier values. The process may further include creating a new entry in the data structure when the data structure does not comprise an entry that includes a counter identifier value identical to the second one of the determined counter identifier values. A counter identifier value of the new entry may include the second one of the determined counter identifier values.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 5A illustrates an exemplary data structure for recording counter values, consistent with the disclosed embodiments.

FIG. 5B illustrates an exemplary data structure for recording counter values, consistent with the disclosed embodiments.

FIG. 5C illustrates an exemplary data structure for recording counter values, consistent with the disclosed embodiments.

FIG. 5D illustrates an exemplary data structure for recording counter values, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
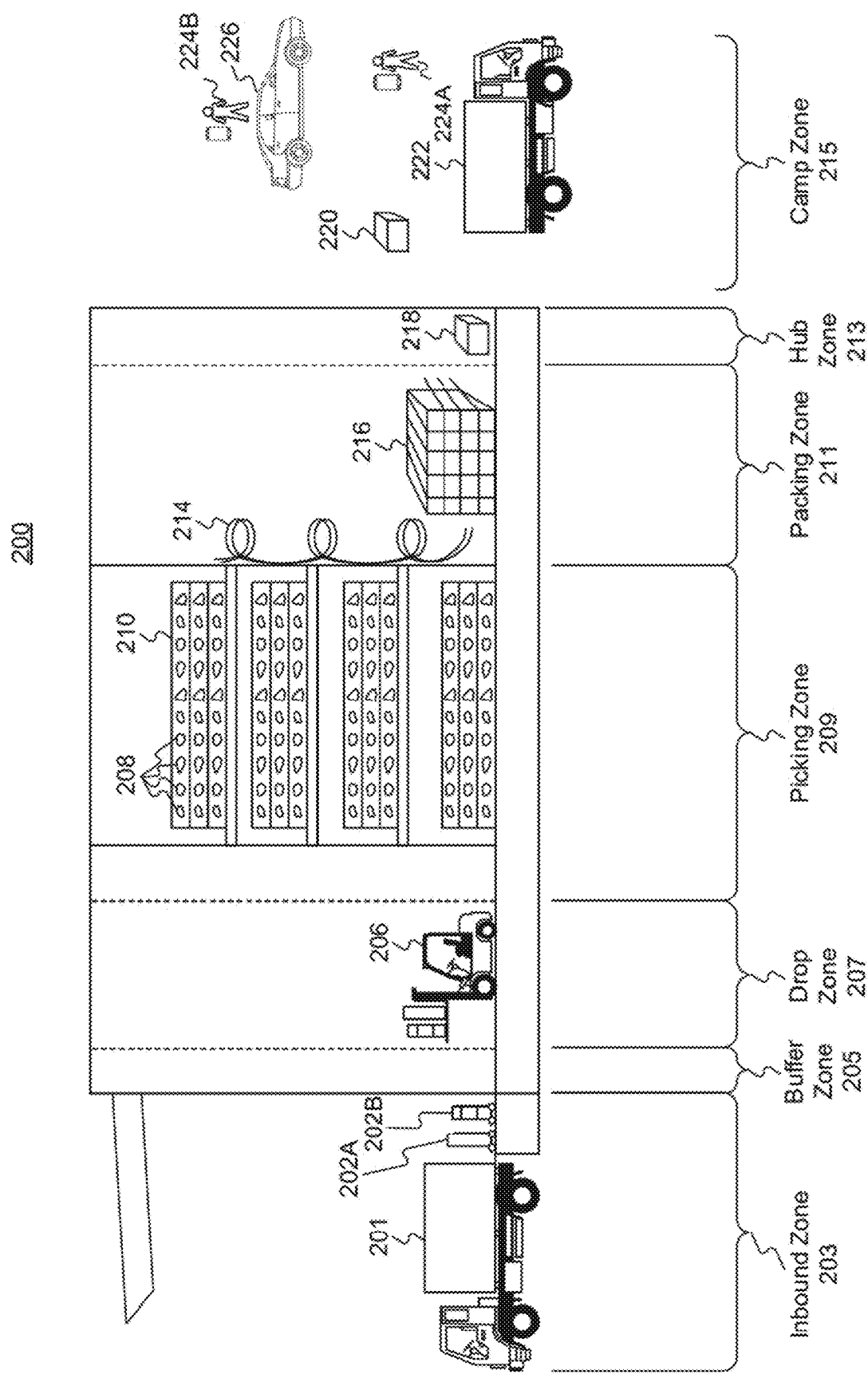
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
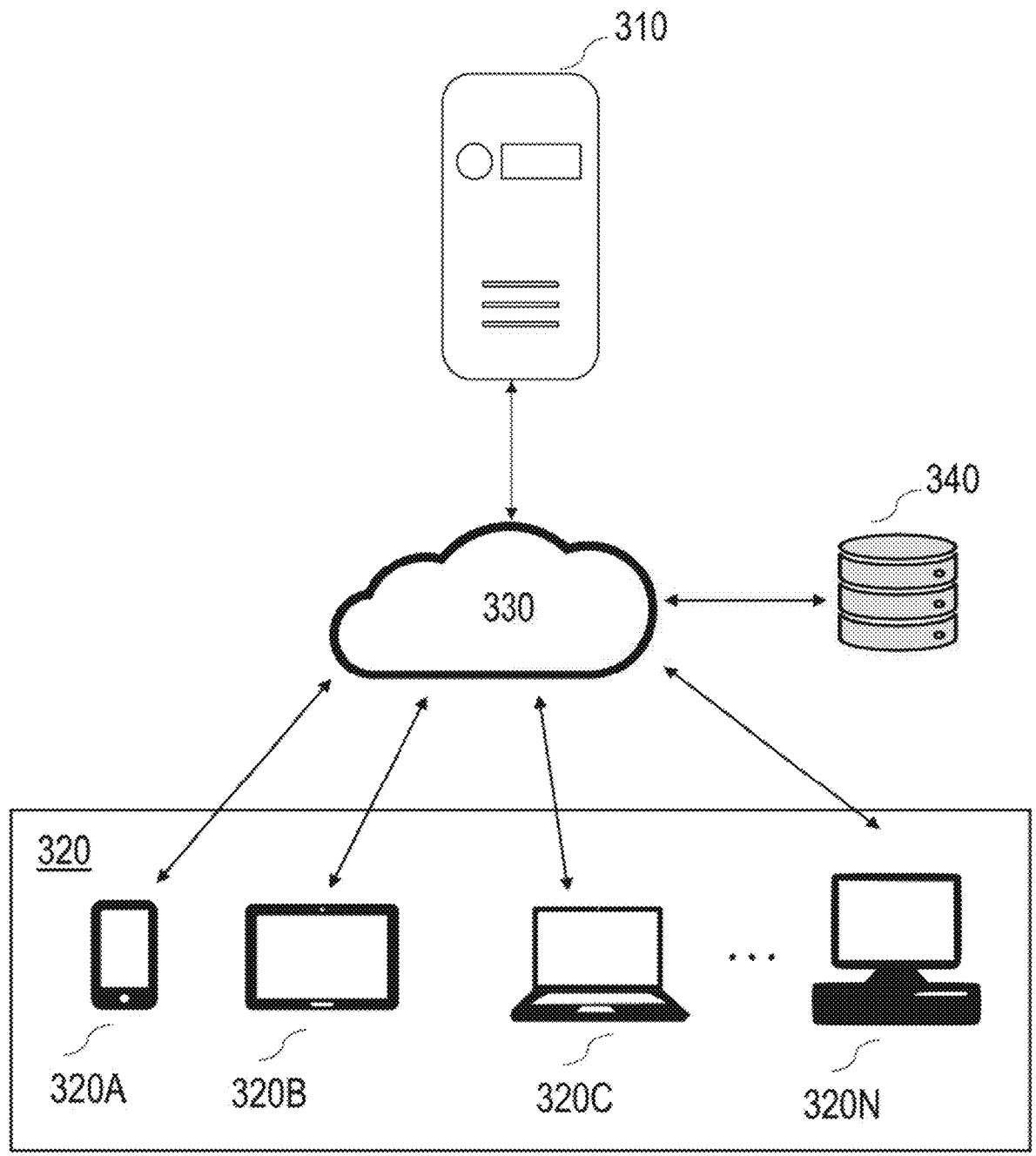
FIG. 3 illustrates a pictographic representation of an exemplary counter system, consistent with the disclosed embodiments.

FIG. 3 is a diagrammatic representation of an exemplary system 300 consistent with the disclosed embodiments. As illustrated in FIG. 3, system 300 may include one or more servers 310, one or more user devices 320 (e.g., user device 320A, user device 320B, user device 320C, . . . , user device 320N, etc.), a network 330, and a database 340.

Server 310 may receive information relating to one or more events. Exemplary events may include one or more of applying a coupon, ordering an item, downloading or streaming a media file (e.g., a movie, a song, an episode of a TV series, etc.), watching a live event (e.g., a concert, an opera, a circus performance, a sports event), or the like, or a combination thereof. Server 310 may also determine whether the one or more events affect a counter value, and if so, server 310 may further modify (increase or decrease) the counter value. Server 310 may further determine whether the counter value is equal to or exceed a predetermined threshold, and if so, server 310 may prohibit the occurrence of the event in the future.

By way of example, server 310 may receive information relating to a first event that the user used a coupon for a first online order placed through system 100 via user device 320A on Aug. 1, 2020. Server 310 may record the first event (i.e., the first use of the coupon) as an entry in a data structure, which may be stored in a storage device locally (e.g., storage device 403 illustrated in FIG. 4) or a network-connected database (e.g., database 340). Server 310 may also add a counter value of "1" into the entry for the user, indicating that the user used a coupon once. In some embodiments, server 310 may also update the counter value in the data structure for the use of the coupon by all users (or referred to as a global counter value) by adding "1" to the global counter value. Server 310 may further determine whether the global counter value is equal to or exceeds a predetermined number. If so, server 310 may prohibit (or cause another component of system 100 to prohibit) the use of the coupon.

While FIG. 3 illustrates one server 310, one skilled in the art would understand that system 300 may include one or more servers 110 that, individually or in combination, perform the functions of server 310 disclosed in this application. For example, server 310 may constitute a cloud server group comprising two or more servers that perform the functions disclosed herein. The term "cloud server" refers to a computer platform that provides services via a network, such as the Internet. In this example configuration, server 310 may use virtual machines that may not correspond to individual hardware. For example, computational and/or storage capabilities may be implemented by allocating appropriate portions of computation/storage power from a scalable repository, such as a data center or a distributed computing environment. In one example, server 310 may implement the methods described herein using customized hard-wired logic, one or more Application Specific Integrated Circuits (ASICs) or Field Programmable Gate Arrays (FPGAs), firmware, and/or program logic which, in combination with the computer system, cause server 310 to be a special-purpose machine.

User device 320 may interact with one or more components of system 100. For example, a user may place an online order with system 100 via user device 320. As another example, a user may download a movie (or play a stream medium) on an online platform of system 100 via user device 320. Server 310 may receive information relating to the interaction between user device 320 and one or more components of system 100.

Network 330 may be configured to facilitate communications among the components of system 100. Network 330 may include wired and wireless communication networks, such as a local-area network (LAN), a wide-area network (WAN), a computer network, a wireless network, a telecommunications network, or the like, or a combination thereof.

Database 340 may be configured to store information and data for one or more components of system 100. For example, database 340 may store the data (e.g., one or more data structures for recording counter values) for server 310.

Figure 4:
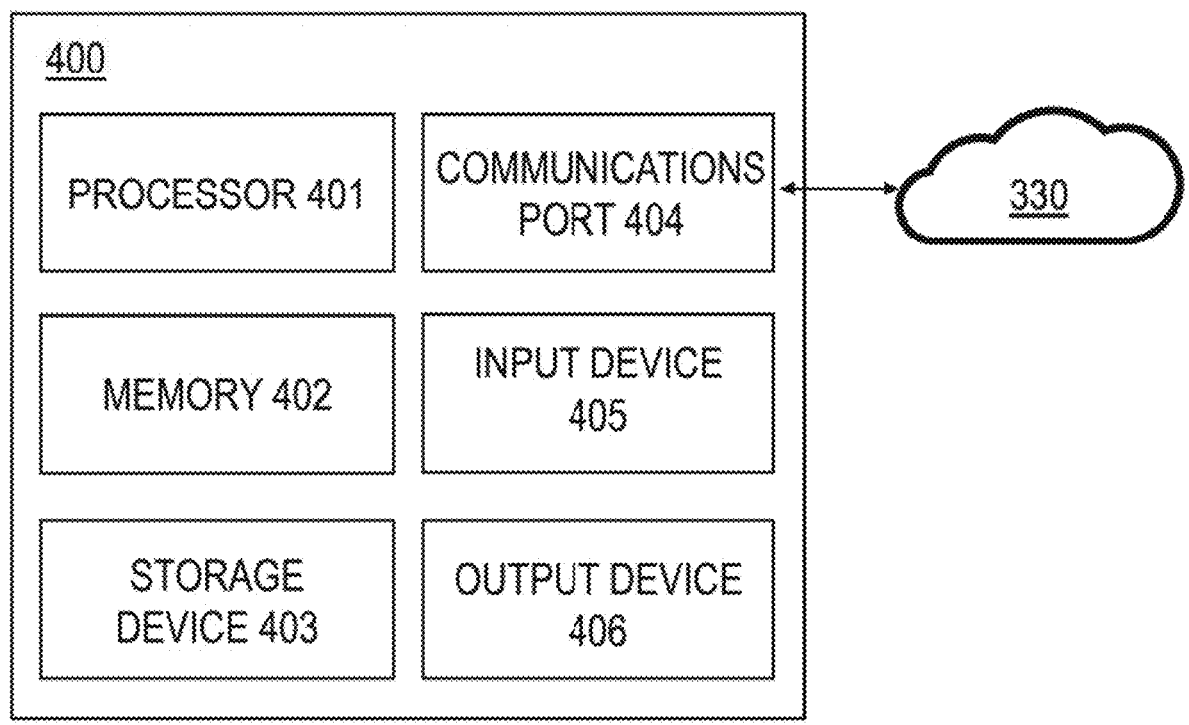
FIG. 4 illustrates a pictographic representation of an exemplary computing device, consistent with the disclosed embodiments.

FIG. 4 is a block diagram of an exemplary computing device 400 consistent with the disclosed embodiments. Server 310 and/or user device 320 may be implemented based on the architecture of computing device 400. For example, server 310 may include one or more components of computing device 400 configured to perform its functions disclosed in this application. As illustrated in FIG. 4, computing device 400 may include at least one processor (e.g., processor 401), a memory 402, at least one storage device (e.g., storage device 403), a communications port 404, an input device 405, and an output device 406.

Processor 401 may be configured to perform one or more functions of server 310 and/or user device 320 described in this application. Processor 401 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 401 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Computing device 400 may also include a memory 402 that may store instructions for various components of computing device 400. For example, memory 402 may store instructions that, when executed by processor 401, may be configured to cause processor 401 to perform one or more functions described herein. Memory 402 may include any number of random-access memories, read-only memories, flash memories, disk drives, optical storage, tape storage, removable storage, and other types of storage. In one instance, memory 402 may be separate from processor 401. In another instance, memory 402 may be integrated into processor 401. In some embodiments, memory 402 may include software for performing one or more computing tasks, as well as a trained system, such as a neural network, or a deep neural network, for example.

Storage device 403 may be configured to store various data and information for one or more components of computing device 400. For example, storage device 403 may store one or more data structures including one or more counter values relating to a promotion (e.g., a coupon, a free item, etc.). Storage device 403 may include one or more hard drives, tapes, one or more solid-state drives, any device suitable for writing and read data, or the like, or a combination thereof.

Communications port 404 may be configured to facilitate data communications between computing device 400 and one or more components of system 100 via network 330. For example, communications port 404 may be configured to receive data from and transmit data to one or more components of system 100 via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. By way of example, server 310 may include communications port 404 configured to receive information relating to one or more events from a user device 320 via network 330. As another example, server 310 may obtain one or more data structures described in this disclosure from database 340 via network 330.

Input device 405 may be configured to receive input from the user of computing device 400, and one or more components of computing device 400 may perform one or more functions in response to the input received. In some embodiments, input device 405 may include an interface displayed on a touchscreen (e.g., output device 406). Output device 406 may be configured to output information and/or data to the user. For example, output device 406 may include a display configured to display one or more data structures and/or one or more entries thereof.

FIG. 5A illustrates an exemplary data structure 500 for recording one or more counter values, consistent with some embodiments of the present disclosure. Data structure 500 may include one or more entries for recording counter values associated with downloads of a movie M1 by one or more users. As illustrated in FIG. 5A, data structure 500 may include an entry 510 associated with all-time downloads by all users and/or an entry 520 associated with daily downloads by all users. Data structure 500 (and each entry of data structure 500) may include a counter identifier field 501 and a counter value field 505. When no downloads have occurred, the value of the counter value field of entry 510 may be set as 0, and the value of the counter value field of entry 520 may be set as 0.

In some embodiments, a counter identifier field may include a plurality of sub-fields. For example, as illustrated in FIG. 5A, counter identifier field 501 may include a counter ID sub-field 502, a user ID sub-field 503, and/or a reset sub-field 504. Reset sub-field 504 may further include a reset frequency sub-field (shown as "reset_frequency") and a reset time sub-field (shown as "reset_at"). The reset frequency sub-field may specify the frequency of resetting the counter value field of the entry. The reset time sub-field may specify the time to reset the counter value field of the entry. Alternatively, the reset time sub-field may specify the time after which the counter value will remain unchanged, and a new entry for a subsequent event may be created after the reset time. For example, entry 510 includes a counter associated with all-time downloads of movie M1 by all users, and the counter of entry 510 may not be reset. By way of example, the reset frequency sub-field of entry 510 may include a value of "NONE" (or a value indicating non-resetting), and the reset time sub-field of entry 510 may include a value of "9999-12-31 23:59:59.000Z" (or a value indicating non-resetting). As another example, entry 520 includes a counter associated with daily downloads of movie M1 by all users, and the counter may be reset daily. By way of example, the reset frequency sub-field of entry 520 may include a value of "DAILY" (or a value indicating the counter being reset daily). The reset time sub-field of entry 520 may include an initial value indicating that the counter should be reset a predetermined time period (e.g., 24 hours) after the time of the first download or a fixed time (e.g., "2020-06-27T23:59:59.000Z"). In some embodiments, the value of reset time sub-field may be updated when the first download occurs (as illustrated in FIG. 5B and described below).

FIG. 5B illustrates data structure 500 updated after a first event (Event 1 illustrated in FIG. 5B), consistent with some embodiments of the present disclosure. Data structure 500 may be stored in storage device 403 illustrated in FIG. 4 and/or database 340, which may be accessed by server 310.

The first event may be that a user (User A) downloaded movie M1 via a user device 320 through a webpage or an application page on Jun. 26, 2020 at 15:00:00 (e.g., GMT+9). Server 310 may obtain information relating to the first event. For example, server 310 may obtain information relating to the user, information relating to the user device to which the movie was downloaded and/or stored, information relating to the movie, and/or information relating to the download. Exemplary information relating to a user may include the user ID (and/or the username), the name, the address, the phone number, the email address, or the like, or a combination thereof. Exemplary information relating to movie M1 may include the counter ID, the title, the medium format (e.g., the resolution, the file size, etc.), or the like, or a combination thereof. Exemplary information relating to the user device may include the model, the internet protocol (IP) address associated with the user device, a network device ID associated with the user device (e.g., media access control (MAC) address), the operating system, or the like, or a combination thereof. Exemplary information relating to the download may include the start time of the download, the completion time of the download, the start time of the first play of the downloaded media file, the time period of completing the download, or the like, or a combination thereof.

In some embodiments, server 310 may obtain information relating to an event from user device 320 associated with a user. For example, server 310 may obtain, from user device 320, information relating to user device 320, such as the model, the internet protocol (IP) address associated with user device 320, the MAC address associated with user device 320, the operating system, or the like, or a combination thereof. Alternatively or additionally, server 310 may determine the start time of the download, the completion time of the download, the start time of the first play of the downloaded media file, the time period of completing the download, or the like, based on one or more timestamps associated with the download. Alternatively or additionally, server 310 may receive data associated with the position of user device 320 determined by a global positioning system (GPS) receiver of user device 320, and determine a time zone associated with the download based on the received data. Server 310 may also determine the start time of the download, the completion time of the download, the start time of the first play of the downloaded media file, the time period of completing the download, or the like, based on the determined time zone. In some embodiments, server 310 may also determine a value of the reset time sub-field for an entry (or an event) based on the start time of the download, the completion time of the download, the start time of the first play of the downloaded media file, the time period of completing the download, or the like, or a combination thereof.

Server 310 may identify a data structure of recording a counter value associated with the download of movie M1. For example, server 310 may identify data structure 500 by searching the counter ID "M1" among the data structure stored in storage device 403.

Server 310 may also update data structure 500 if one or more entries are affected by the first event. For example, server 310 may determine one or more first counter identifier values in the counter identifier field of data structure 500 for the first event. Server 310 may also determine whether data structure 500 includes an entry that has a counter identifier value that is identical to one of the one or more first counter identifier values. If server 310 identifies an existing entry that has a matched (or identical) counter identifier value, server 310 may update the counter value of the identified entry, by, for example, adding "1" into the counter value. On the other hand, if server 310 determines that data structure 500 does not include any entries having the same counter identifier value, server 310 may create a new entry and assign the determined counter identifier value for the event as the counter identifier value of the new entry. Server 310 may also insert the new entry into data structure 500 by, for example, appending the new entry to the last entry of data structure 500.

By way of example, as described elsewhere in this disclosure, data structure 500 may include counter identifier field 501 (illustrated in FIG. 5A), which may include three subfields—the "counter_id" sub-field, the "user_id" sub-field, and the reset sub-field (which may, in turn, include a "reset_frequency" sub-field and a "reset_at" sub-field). The first event (i.e., User A downloaded movie M1 into a user device 320) may affect four types of downloads: (1) all-time download(s) by User A; and (2) daily download(s) by User A; (3) all-time download(s) by all users; (4) daily download (s) by all users. Accordingly, server 310 may determine a value of the counter identifier field for each of the four types of downloads (which may correspond to four entries) based on the information relating to the download by User A.

For example, server 310 may determine a first counter identifier value for the all-time download(s) by User A, which may include a value "M1" for the "counter_id" sub-field, a value of "A" for the "user_id" sub-field, a value of "NONE" for the "reset_frequency" sub-field, and a value of "9999-12-31 23:59:59.000Z" for the "reset_at" sub-field. Similarly, server 310 may determine a second counter identifier value for the daily download(s) by User A, which may include a value of "M1" for the "counter_id" sub-field, a value of "A" for the "user_id" sub-field, a value of "DAILY" for the "reset_frequency" sub-field, and a value of "2020-06-27T 00:00:00.000Z," which may be set as the start of the next day (i.e., Jun. 27, 2020 at 00:00:00), for the "reset_at" sub-field. Alternatively, server 310 may set a predetermined time period (e.g., 24 hours) after the start time or the completion time of the download, or the first time of playing the downloaded media file for the value of the "reset_at" sub-field.

Server 310 may also determine counter identifier values associated with all-time and daily downloads by all users. By way of example, server 310 may determine a third counter identifier value for all-time download(s) by all users, which may include a value of "M1" for the "counter_id" sub-field, a value of "ALL USERS" for the "user_id" sub-field, a value of "NONE" for the "reset_frequency" sub-field, and a value of "9999-12-31 23:59:59.000Z" for the "reset_at" sub-field. Similarly, server 310 may determine a fourth counter identifier value for the daily download(s) by all users, which may include a value of "M1" for the "counter_id" sub-field and a value of "ALL USERS" for the "user_id" sub-field, a value of "DAILY" for the "reset_frequency" sub-field, and a value of "2020-06-27T 00:00: 00.000Z" (i.e., the start of the next day) for the "reset_at" sub-field. Alternatively, the "reset_at" sub-field may be reset daily a predetermined time period (e.g., 24 hours) after the start time or the completion time of the download, or the first time of playing the downloaded media file.

Server 310 may further determine whether data structure 500 includes an entry having a counter identifier value that is identical to one of the one or more determined counter identifier values for the event. For example, as described above, server 310 may determine the third counter identifier value of "M1; ALL USERS; NONE; 9999-12-31 23:59: 59.000Z" for all-time download(s) by all users. Server 310 may also determine that the third counter identifier value is the same as the counter identifier value of entry 510, and identify entry 510 as a relevant entry. Server 310 may further update the counter value of entry 510 by adding "1" to the counter value (which was "0" before the download by User A as illustrated in FIG. 5A). As another example, server 310 may determine that the fourth counter identifier value (for daily download(s) by all users) is the same as the counter identifier value of entry 520, and identify entry 520 as another relevant entry. Server 310 may also update the counter value of entry 520 by adding "1" to the counter value (which was "0" before the download by User A as illustrated in FIG. 5A).

If server 310 determines that data structure 500 does not include an entry that has a counter identifier value identical to a determined counter identifier value, server 310 may create a new entry. Server 310 may also assign the determined counter identifier value as the counter identifier value of the new entry and insert the new entry into data structure 500. For example, as described above, server 310 may determine the first counter identifier value of "M1; A; NONE; 9999-12-31 23:59:59.000Z" for the all-time download(s) by User A. Server 310 may also determine that the first counter identifier value does not match any counter identifier values of the existing entries in data structure 500. Server 310 may further create a new entry 530, assign the first counter identifier value to the counter identifier value of entry 530, and add the counter value of 1 into the counter value field of entry 530. Server 310 may also insert entry 530 into data structure 500 by, for example, appending to the last entry in data structure (i.e., entry 520). Similarly, server 310 may determine that the second counter identifier value (for the daily download(s) by User A) does not match any counter identifier values of the existing entries in data structure 500. Server 310 may create a new entry 540, assign the second counter identifier value as the counter identifier value of entry 540, and add the counter value of 1 into the counter value field of entry 540. Server 310 may also insert entry 540 into data structure 500 by, for example, appending entry 540 to entry 530).

Server 310 may update one or more existing entries in data structure 500 and/or add one or more new entries into data structure 500 for one or more subsequent events. For example, User A may download movie M1 again on the same day (e.g., Jun. 26, 2020 at 20:00:00), which is referred herein as the second event (and Event 2 illustrated in FIG. 5C). Server 310 may obtain information relating to the event as described elsewhere in this disclosure. By way of example, server 310 may obtain the counter ID associated with movie M1, the user ID of User A, and the start time (and/or the completion time) of the download. Server 310 may also determine one or more counter identifier values for the event as described elsewhere in this disclosure. For example, server 310 may determine a counter identifier value of "M1; A; NONE; 9999-12-31 23:59:59.000Z" for the all-time downloads by User A. As another example, server 310 may also determine a counter identifier value of "M1; A; DAILY; 2020-06-27T 15:00:00.000Z" for the daily downloads by User A. In some embodiments, the value of the "reset_at" sub-field may not change if the download time (the start or the completion time) is within a predetermined time period (e.g., 24 hours). Server 310 may further determine counter identifier values for the all-time and daily downloads by all users as described elsewhere in this disclosure.

Server 310 may determine whether a determined counter identifier value matches any counter identifier values of the existing entries in data structure 500. If so, server 310 may identify the corresponding entry and update the counter value of the identified entry. On the other hand, if data structure 500 does not include an entry having a counter identifier value matching (or identical to) a particular determined counter identifier value, server 310 may create a new entry, assign the determined counter identifier value as the counter identifier value of the new entry, and add a counter value of 1 into the counter value field of the new entry. Server 310 may also insert the new entry into data structure 500. For example, as illustrated in FIG. 5C, server 310 may identify four entries: entry 510, entry 520, entry 530, and entry 540, each of which includes a counter identifier value that matches one of the determined counter identifier values described above. Server 310 may also update the counter value of each of entry 510, entry 520, entry 530, and entry 540 by adding "1."

FIG. 5D illustrates data structure 500 updated after a third event (Event 3 illustrated in FIG. 5D). The third event may be that another user, User B, downloaded movie M1 on Jun. 26, 2020 at 21:00:00. Server 310 may obtain information relating to the event as described elsewhere in this disclosure. By way of example, server 310 obtain the counter ID associated with movie M1, the user ID of User B, and the start time (and/or the completion time) of the download by User B. As described elsewhere in this disclosure, server 310 may also determine one or more counter identifier values for the third event. For example, for the third event, server 310 may determine a first counter identifier value of "M1; B; NONE; 9999-12-31 23:59:59.000Z" for all-time download (s) by User B, a second counter identifier value of "M1; B; DAILY; 2020-06-27T16:00:00.000Z" for daily download(s) by User B, a third counter identifier value of "M1; ALL USERS; NONE; 9999-12-31 23:59:59.000Z" for all-time downloads by all users, and a fourth counter identifier value of "M1; ALL USERS; DAILY; 2020-06-27T 00:00: 00.000Z" for daily downloads by all users. As described elsewhere in this disclosure, server 310 may also determine whether data structure 500 includes an entry having a counter identifier value that matches the one or more determined counter identifier values for the event. By way of example, server 310 may determine that the counter identifier value of entry 510 matches the determined third counter identifier value, and the counter identifier value of entry 520 matches the determined fourth counter identifier value. Server 310 may update the counter values of entry 510 and entry 520 by adding 1 to the counter values, as described elsewhere in this disclosure. On the other hand, server 310 may determine that no existing entries in data structure 500 include a counter identifier value that matches the determined first counter identifier value or the determined second counter identifier value. Server 310 may create a new entry for each of the determined first counter identifier value and the determined second counter identifier value, and insert the new entries (i.e., entry 550 and entry 560 illustrated in FIG. 5D) into data structure 500, as described elsewhere in this disclosure.

Figure 5E:
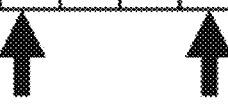
FIG. 5E illustrates an exemplary data structure for recording counter values, consistent with the disclosed embodiments.

FIG. 5E illustrates data structure 500 updated after a fourth event (Event 4 illustrated in FIG. 5E). The fourth event may be that User A downloaded movie M1 again on Jun. 27, 2020 at 16:00:00.

In some embodiments, server 310 may keep the counter of the daily download(s) by all users (i.e., the counter value of the counter value field of entry 520 in data structure 500) unchanged after Jun. 27, 2020 at 00:00:00, which is specified in the "reset_at" sub-field of entry 520. For example, server 310 may prevent any data written to entry 520 by, for example, setting entry 520 as read-only. Server 310 may also keep the counter of the daily download(s) by User A (i.e., the counter value of the counter value field of entry 520 in data structure 500) unchanged after Jun. 27, 2020 at 00:00:00, which is specified in the "reset_at" sub-field of entry 540. For example, server 310 may prevent any data written to entry 530 by, for example, setting entry 530 as read-only. In some embodiments, server 310 may also create a new entry in data structure 500 after the reset time. For example, at (or after) the time specified in the "reset_at" field (e.g., Jun. 27, 2020 at 00:00:00), server 310 may create a new entry for daily download(s) by all users, which may have a counter identifier value of "M1; ALL USERS; DAILY; 2020-06-28T 00:00:00.000Z" and a counter value of "0" (since no downloads may not have occurred at the reset time).

Server 310 may obtain information relating to the event and determine one or more counter identifier values based on the obtained information, as described elsewhere in this disclosure. By way of example, server 310 may determine a first counter identifier value of "M1; A; NONE; 9999-12-31 23:59:59.000Z" for all-time download(s) by User A, a second counter identifier value of "M1; A; DAILY; 2020-06-28T16:00:00.000Z" for daily download(s) by User A, a third counter identifier value of "M1; ALL USERS; NONE; 9999-12-31 23:59:59.000Z" for all-time downloads by all users, and a fourth counter identifier value of "M1; ALL USERS; DAILY; 2020-06-28T 00:00:00.000Z" for daily downloads by all users. Assuming that server 310 has not created a new entry (e.g., entry 580 illustrated in FIG. 5E but having a counter value of "0") for daily download(s) by all users at or after the reset time as described above, server 310 may also identify entry 510, entry 520, and entry 530, each of which includes a counter identifier value matching one of the determined counter identifier values. On the other hand, if server 310 has already created a new entry 580 for daily download(s) by all users at, for example, Jun. 28, 2020 at 00:00:00.000, server 310 may also identify entry 580 matching the fourth counter identifier value.

Server 310 may further update the counter values of entry 510, entry 520, and entry 530 (and entry 580 if it has been created at or after a reset time). Server 310 may also determine that no existing entries in data structure 500 have a counter identifier value matching the second counter identifier value (for daily download(s) by User A). Server 310 may create a new entry 570 for the second counter identifier value and insert entry 570 in data structure 500. In the event that a new entry has not been created for daily download(s) by all users at or after a reset time, server 310 may also create a new entry 580 and insert entry 580 into data structure 500. By way of example, server 310 may identify entry 540, which includes a value of the "reset_frequency" sub-field (i.e., a sub-field of the counter identifier field) that is identical to a sub-value of the second counter identifier value (e.g., corresponding to the "reset_frequency" sub-field). Server 310 may append new entry 570 to entry 540. Alternatively, server 310 may insert entry 570 after the last entry of data structure 500 (e.g., after entry 560). As another example, server 310 may identify entry 520, which includes a value of the "reset_frequency" sub-field (i.e., a sub-field of the counter identifier field) that is identical to a sub-value of the fourth counter identifier value (e.g., corresponding to the "reset_frequency" sub-field). Server 310 may append new entry 580 to entry 520. Alternatively, server 310 may insert entry 580 after the last entry of data structure 500 (e.g., after entry 560 or entry 570, whichever is the last entry).

In some embodiments, server 310 may prohibit a download by a particular user or all users if a counter value of an entry is equal to or exceeds a predetermined threshold. For example, as described elsewhere in this disclosure, after User A downloaded movie M1 on Jun. 27, 2020 at 16:00:00, server 310 may update the counter value of entry 530 (for all-time downloads by User A) to "3," which may indicate that User A can only download movie M1 three times. Server 310 may determine that the counter value of entry 530 is equal to a predetermined threshold "3." Server 310 may also prohibit any downloads by User A in the future, by, for example, sending an instruction to a file server where the media file of movie M1 to prevent any further downloads by User A. Alternatively or additionally, server 310 may transmit a message to a user device associated with User A indicating that the user cannot download movie M1 anymore. As another example, server 310 may update the counter value of entry 510 to "4," after User A's download on Jun. 27, 2020. Server 310 may also determine that the counter value of entry 510 is equal to a predetermined threshold of "4," which may indicate that movie M1 can be downloaded by all users four times. Server 310 may further prohibit downloads of movie M1 by any users (including User A) in the future.

Figure 6:
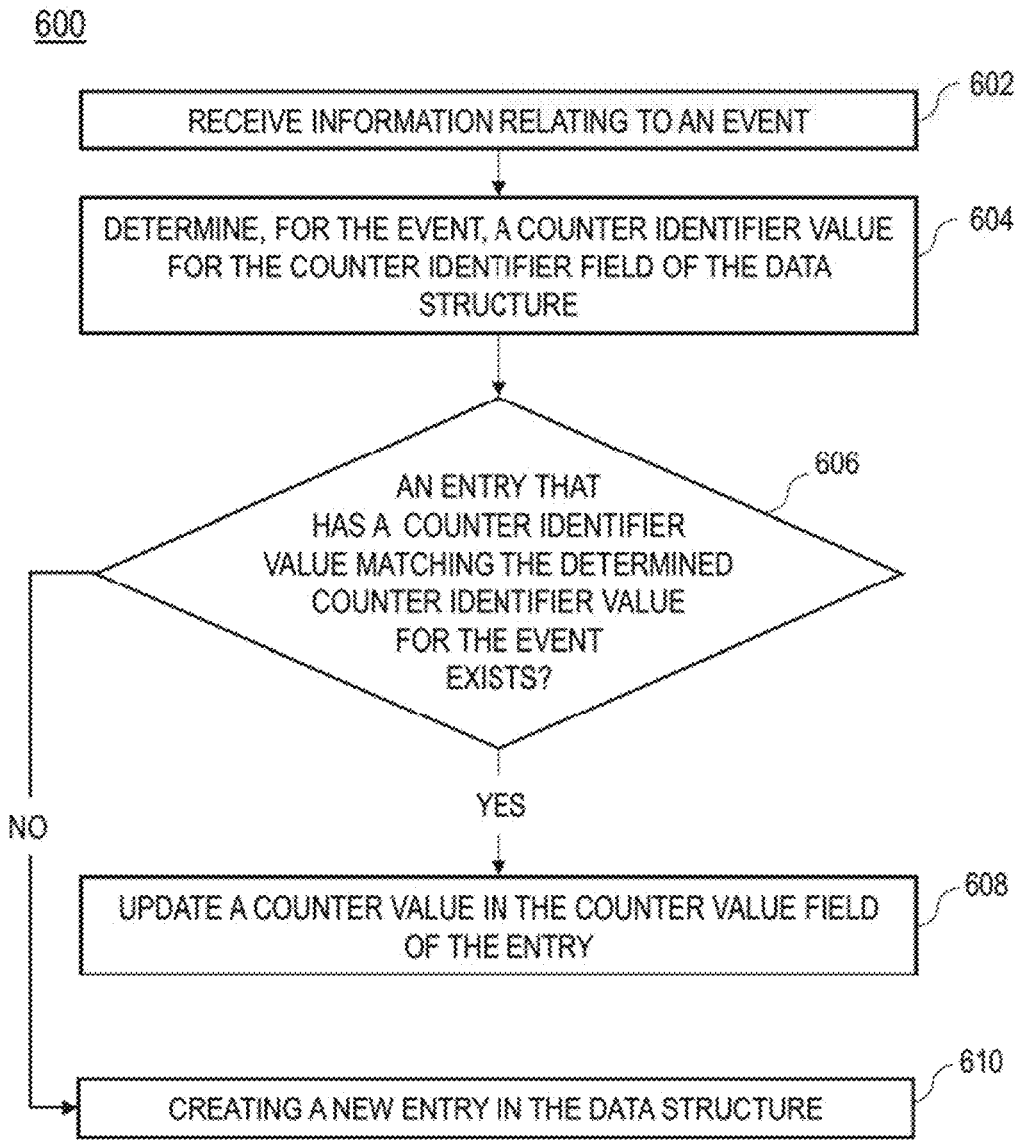
FIG. 6 illustrates a flowchart of an exemplary process for updating a data structure, consistent with the disclosed embodiments.

FIG. 6 illustrates a flowchart of an exemplary process 600 for updating a data structure, consistent with some embodiments of the present disclosure. While process 600 is described below using server 310 as an example, one skilled in the art would understand that another component or other components of system 100 may perform one or more steps of process 600. In some embodiments, one or more processors of server 310 (e.g., one or more processors 401 illustrated in FIG. 4) may be configured to perform one or more steps of process 600.

At step 602, server 310 may receive information relating to an event. For example, the event may be that a user (e.g., User A illustrated in FIG. 5B) downloads a movie M1 on Jun. 26, 2020 at 15:00:00 (e.g., GMT+9). Server 310 may obtain information relating to the first event. For example, server 310 may obtain information relating to the user, information relating to the user device to which the movie was downloaded, information relating to the movie, information relating to the download, or the like, or a combination thereof, as described elsewhere in this disclosure. By way of example, server 310 may obtain a counter ID associated with movie M1 (e.g., M1), a user ID associated with User A (e.g., A), and the completion time of the download (e.g., Jun. 26, 2020 at 15:00:00).

In some embodiments, server 310 may identify one or more data structures relating to movie M1. For example, server 310 may identify data structure 500 (as illustrated in FIG. 5A) by, for example, searching the counter ID among the data structures stored in storage device 403.

Referring to FIG. 6, at step 604, server 310 may determine, for the event, one or more counter identifier values for the counter identifier field of the data structure. For example, as described elsewhere in this disclosure, server 310 may determine a first counter identifier value of "M1; A; NONE; 9999-12-31 23:59:59.000Z" for the all-time download(s) by User A, a second counter identifier value of "M1; A; DAILY; 2020-06-27T 15:00:00.000Z" for daily download(s) by User A, a third counter identifier value of "M1; ALL USERS; NONE; 9999-12-31 23:59:59.000Z" for all-time downloads by all users, and a fourth counter identifier value of "M1; ALL USERS; DAILY; 2020-06-27T 00:00:00.000Z" for daily downloads by all users.

In some embodiments, server 310 may determine the value of the resetting sub-field of a counter identifier value based on a timestamp associated with an event. For example, User A may complete a download of movie M1 on Jun. 26, 2020 at 15:00:00. Server 310 may determine a timestamp associated with the completion of the download (e.g., 2020-06-26T15:00:00.000Z) and determine the value of the resetting sub-field as "2020-06-27T15:00:00.000Z" by, for example, adding 24 hours to the determined timestamp. In some embodiments, server 310 may determine a timestamp associated with an event further based on a time zone associated with the download.

At step 606, server 310 may determine whether the data structure includes an entry that has a counter identifier value matching a determined counter identifier value. If so, process 600 may proceed to step 608, where server 310 may update (increase or decrease) the counter value of the existing entry. On the other hand, if server 310 determines that the data structure does not include an entry that has a counter identifier value matching the determined counter identifier value, process 600 may proceed to step 610, where server 310 may create a new entry in the data structure for the determined counter identifier value.

For example, as illustrated in FIG. 5B and as described elsewhere in this disclosure, at step 606, server 310 may determine that the counter identifier value of entry 510 matches the determined third counter identifier value, and the counter identifier value of entry 520 matches the determined fourth counter identifier value. Server 310 may, at step 608, update the counter values of entry 510 and entry 520 by, for example, adding "1" to the counter values. As another example, at step 606, server 310 may determine that data structure 500 does not include an entry having a counter identifier value matching the determined first counter identifier value or the determined second counter identifier value. Server 310 may, at step 610, create a new entry 530 for the third counter identifier value and a new entry 540 for the fourth counter identifier value in data structure 500. For example, server 310 may create entry 530, assign the third counter identifier value as the counter identifier value of entry 530, and insert entry 530 into data structure 500 by, for example, appending entry 530 to the last entry (e.g., entry 520). Similarly, server 310 may create entry 540, assign the fourth counter identifier value as the counter identifier value of entry 540, and insert entry 540 into data structure 500 by, for example, appending entry 540 to the last entry (i.e., now entry 530).

As described above, server 310 may create one or more new entries and/or update one or more existing entries in response to the occurrence of an event (e.g., the third event described above). In some embodiments, server 310 may determine whether the counter value of a new entry or an updated counter value of an existing entry equals to or exceeds a threshold. If server 310 determines that the counter value of an entry equals to or exceeds the threshold, server 310 may prohibit the occurrence of an event in the future. For example, as described above, server 310 may update the counter value of entry 510 (for the all-time downloads by all users) to "4" after User A downloads movie M1 on Jun. 28, 2020. Server 310 may determine that the counter value "4" equals to a threshold "4" for the all-time downloads by all users (which may indicate that the number of all-time downloads by all users should not exceed 4). Server 310 may also prohibit the download of movie M1 by any users in the future.

As another example, server 310 may determine that the counter value "3" of entry 530 equals a threshold "3" for all-time downloads by an individual user. Server 310 may also prohibit any future downloads by User A. Server 310 may still allow download(s) of movie M1 by other users if server 310 determines that the counter value of entry 510 is less than a threshold for all-time downloads by all users (e.g., a threshold of 100).

Figure 7:
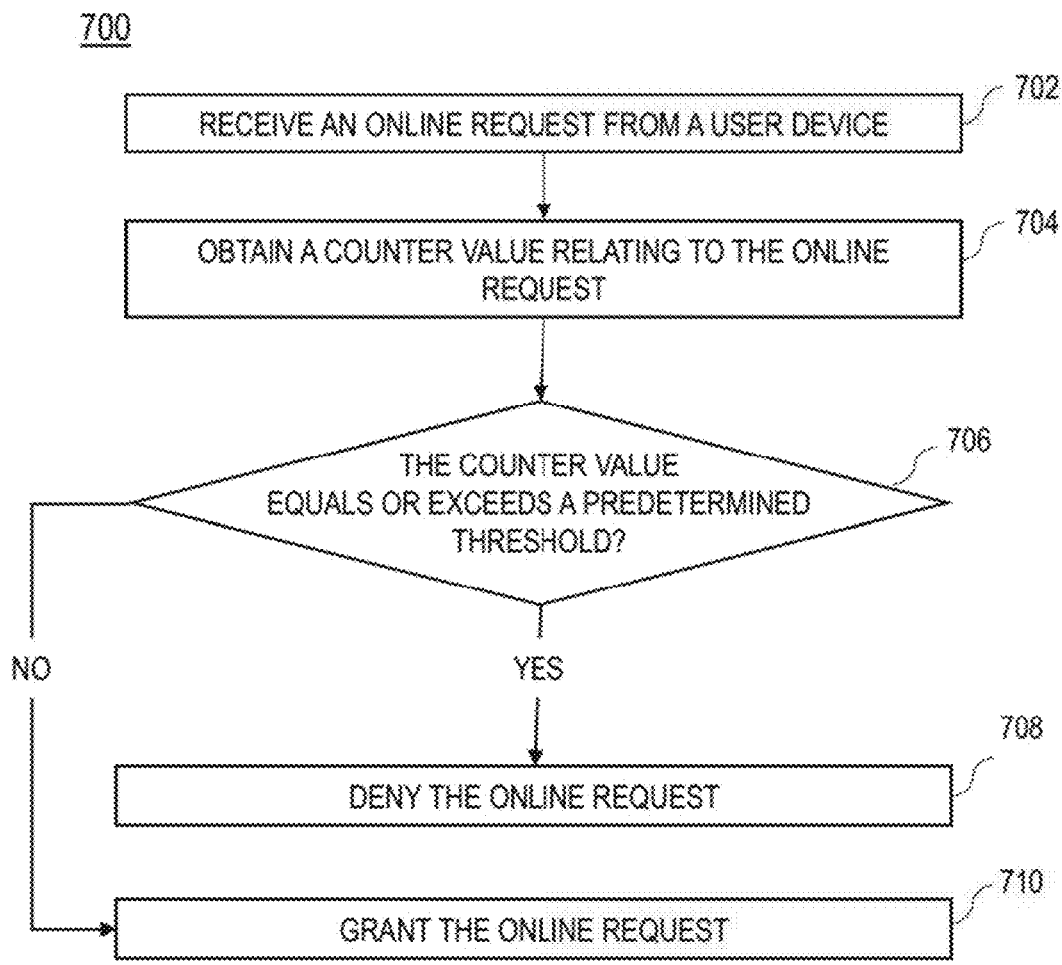
FIG. 7 illustrates a flowchart of an exemplary process for responding to an online request by a user, consistent with the disclosed embodiments.

FIG. 7 illustrates a flowchart of an exemplary process for responding to an online request by a user, consistent with the disclosed embodiments. While process 700 is described below using server 310 as an example, one skilled in the art would understand that another component or other components of system 100 may perform one or more steps of process 700. In some embodiments, one or more processors of server 310 (e.g., one or more processors 401 illustrated in FIG. 4) may be configured to perform one or more steps of process 700.

At step 702, server 310 may receive an online request from a user via a user device 320. An online request may relate to one or more events described in this disclosure. For example, an online request may include a request for applying a coupon to an order (e.g., a pending order, a placed order, etc.), a request for downloading or streaming a media file (e.g., a movie, a song, an episode of a TV series, etc.), a request for accessing data or information (e.g., an electronic book, an electronic journal, electronic newspapers, etc.), or the like, or a combination thereof.

In some embodiments, server 310 may obtain information relating to the online request. For example, server 310 may obtain information relating to the user, information relating to the user device from which the online request was received, information relating to the item (e.g., a coupon), data, and/or information requested in the online request, or the like, or a combination thereof. Exemplary information relating to a user may include the user ID (and/or the username), the name, the address, the phone number, the email address, or the like, or a combination thereof. Exemplary information relating to the item, data, and/or information requested may include the ID and description of the item, data, and/or information (e.g., a coupon number, a movie title, etc.), or the like, or a combination thereof. Exemplary information relating to the user device may include the model, the internet protocol (IP) address associated with the user device, a network device ID associated with the user device (e.g., media access control (MAC) address), the operating system, or the like, or a combination thereof.

By way of example, User C may transmit to server 310 an online request to download Movie M1 on Jun. 29, 2020. Server 310 may receive the online request and obtain information relating to User A (e.g., the user ID "C", the user account information, etc.) and information relating to movie M1 (e.g., counter ID "M1").

At step 704, server 310 may obtain one or more counter values relating to the online request. For example, server 310 may identify data structure 500 illustrated in FIG. 5E based on the obtained information. By way of example, server 310 may identify data structure 500 based on counter ID "M1." Server 310 may also identify one or more entries in data structure 500 that are relevant to the online request by User C. Server 310 may determine one or more counter identifier values based on the information relating to the online request similar to the process for determining one or more counter identifier values (or a sub-field thereof) for an event as described elsewhere in this disclosure (e.g., step 604 of process 600). For example, for the online request, server 310 may determine two counter identifier values, each of which may match one of the counter identifier values of entry 510 and entry 520 (illustrated in FIG. 5E). Server 310 may identify entry 510 and entry 520 as relevant entries. Server 310 may also obtain the counter value of entry 510 and/or the counter value of entry 520.

Referring to FIG. 7, at step 706, server 310 may determine whether a counter value equals or exceeds a threshold. If so, process 700 may proceed to step 708, where server 310 may deny the online request (or prohibit the occurrence of a relevant event). On the other hand, if server 310 determines that a counter value is less than the threshold, process 700 may proceed to step 710, where server 310 may grant the online request (or permit the occurrence of a relevant event).

For example, as described above, server 310 may obtain the counter value "4" of entry 510, which may indicate that the number of the all-time downloads by all users equals to 4. Server 310 may also determine whether the counter value "4" equals (or exceeds) a threshold (for the all-time downloads by all users). For example, the threshold may be 4, which may indicate that the all-time downloads by all users may not exceed 4. In this example, server 310 may determine that the counter value for the all-time downloads by all user equals the threshold, and process 700 may proceed to step 708, where server 310 may deny the online request by User C to download movie M1. On the other hand, if server 310 determines that the counter value is less than the threshold, process 700 may proceed to step 710, where server 310 may grant the online request by User C to download movie M1. Server 310 may also update one or more counter values in data structure 500 illustrated in FIG. 5E when User C downloads movie M1, as described elsewhere in this disclosure.

While the examples given for illustrating the systems of the methods described herein are relating to downloads of a movie file by users, one skilled in the art would understand that the systems and methods may be used for updating a counter for other types of events. For example, a first event may be that a first user uses a coupon for an online order. Server 310 may update the counter value of an entry (or create a new entry) in a data structure for the all-time usage of the coupon by this user, the daily usage of the coupon by this user, the all-time usage of the coupon by all users, and/or the daily usage of the coupon by all users. Server 310 may take a particular action if the counter value of an entry is equal to or exceeds a predetermined number. For example, if server 310 determines that the counter value of the entry for the all-time use of a coupon is equal to or exceeds a predetermined number (e.g., the limit of 5,000 coupons available daily for all users), server 310 may prevent the application of the coupon for all orders to be placed on the online shopping website.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for updating a counter value in a data structure, comprising:
   a memory storing instructions; and
   at least one processor configured to execute the instructions to perform a process, the process comprising:
      receiving information relating to a first event;
      creating, for the first event, a first entry in a data structure, the first entry including a first counter identifier value for a counter identifier field of the data structure;
      receiving information relating to a second event, wherein the second event comprises an online request from a user device;
      determining, for the second event, a second counter identifier value for the counter identifier field of the data structure;
      determining that the second counter identifier value matches the first counter identifier value;
      increasing a counter value in a counter value field of the first entry;
      determining whether the counter value is equal to or exceeds a predetermined threshold; and
      in response to the determination, automatically sending an instruction, over a network, to a server located separately from the computer-implemented system to cause the server to deny a future request from the user device.

2. The system of claim 1, wherein the process further comprises:
   receiving information relating to a third event;
   determining, for the third event, a third counter identifier value for the counter identifier field of the data structure;
   determining that the third counter identifier value does not match any counter identifier values in the data structure; and
   creating, for the third event, a second entry in the data structure, wherein a counter identifier value of the second entry comprises the third counter identifier value.

3. The system of claim 2, wherein the process further comprises: appending the second entry to a last entry of the data structure.

4. The system of claim 2, wherein:
   the counter identifier field of the data structure comprises a plurality of counter identifier sub-fields;
   the third counter identifier value comprises a plurality of third counter identifier sub-values, each of the plurality of third counter identifier sub-values corresponding to one of the plurality of counter identifier sub-fields; and
   the process further comprises:
      identifying, in the data structure, an existing entry that comprises at least one counter identifier sub-value, in the counter identifier field of the second entry, identical to one of the plurality of third counter identifier sub-values; and
      appending the second entry to the identified existing entry.

5. The system of claim 2, wherein:
   the counter identifier field of the second entry comprises a reset time sub-field for indicating a time for resetting a counter field of the second entry; and
   creating the second entry comprises:
      determining a timestamp associated with the third event; and
      determining, based on the time stamp associated with the third event, a time value for the reset time sub-field.

6. The system of claim 1, wherein the counter identifier field of a particular entry comprises a reset time sub-field indicating a time for resetting a counter value field of the particular entry.

7. The system of claim 1, wherein a counter identifier field of a particular entry comprises a reset frequency sub-field indicating a frequency for resetting a counter value field of the particular entry.

8. The system of claim 1, wherein a counter identifier field of a particular entry comprises a user identifier sub-field indicating a user identifier associated with the particular entry.

9. The system of claim 1, wherein the first event comprises an interaction by a user device with a webpage or an application page.

10. A computer-implemented method for updating a counter value in a data structure, the method comprising:
   receiving information relating to a first event;
   creating, for the first event, a first entry in a data structure, the first entry including a first counter identifier value for a counter identifier field of the data structure;
   resetting a counter field of the first entry based on a predetermined time point;
   receiving information relating to a second event, wherein the second event comprises an online request from a user device;
   determining, for the second event, a second counter identifier value for the counter identifier field of the data structure;

determining that the second counter identifier value matches the first counter identifier value;

increasing a counter value in a counter value field of the first entry;

determining whether the counter value is equal to or exceeds a predetermined threshold; and in response to the determination, automatically sending an instruction, over a network, to a server located separately from the computer-implemented system to cause the server to deny a future request from the user device.

11. The method of claim 10, further comprising determining the predetermined time point based on a timestamp associated with the first event.

12. The method of claim 11, wherein determining the predetermined time point based on the timestamp associated with the first event comprises determining a time point after a particular time period after the timestamp as the predetermined time point.

13. The method of claim 10, further comprising:
receiving information relating to a third event;
determining, for the third event, a third counter identifier value for the counter identifier field of the data structure;
determining that the third counter identifier value does not match any counter identifier values in the data structure;
creating, for the third event, a second entry in the data structure, wherein a counter identifier value of the second entry comprises the third counter identifier value; and
appending the second entry to a last entry of the data structure.

14. The method of claim 13, further comprising:
receiving information relating to a third event;
determining, for the third event, a third counter identifier value for the counter identifier field of the data structure;
determining that the third counter identifier value does not match any counter identifier values in the data structure; and
creating, for the third event, a second entry in the data structure, wherein a counter identifier value of the second entry comprises the third counter identifier value, wherein the counter identifier field of the data structure comprises a plurality of counter identifier sub-fields;
the third counter identifier value comprises a plurality of third counter identifier sub-values, each of the plurality of third counter identifier sub-values corresponding to one of the plurality of counter identifier sub-fields; and
the method further comprises:
identifying, in the data structure, an existing entry that comprises at least one counter identifier sub-value, in the counter identifier field of the second entry, identical to one of the plurality of third counter identifier sub-values; and
appending the second entry to the identified existing entry.

15. The method of claim 10, wherein the counter identifier field of a particular entry comprises a reset time sub-field indicating a time for resetting a counter value field of the particular entry.

16. The method of claim 10, wherein a counter identifier field of a particular entry comprises a reset frequency sub-field indicating a frequency for resetting a counter value field of the particular entry.

17. The method of claim 10, wherein a counter identifier field of a particular entry comprises a user identifier sub-field indicating a user identifier associated with the particular entry.

18. The method of claim 10, wherein the first event comprises an interaction by a user device with a webpage or an application page.

* * * * *